Sept. 25, 1951 A. F. HESSELBERG 2,569,055
PROCESS OF MAKING SHOES
Filed March 4, 1947 7 Sheets-Sheet 1
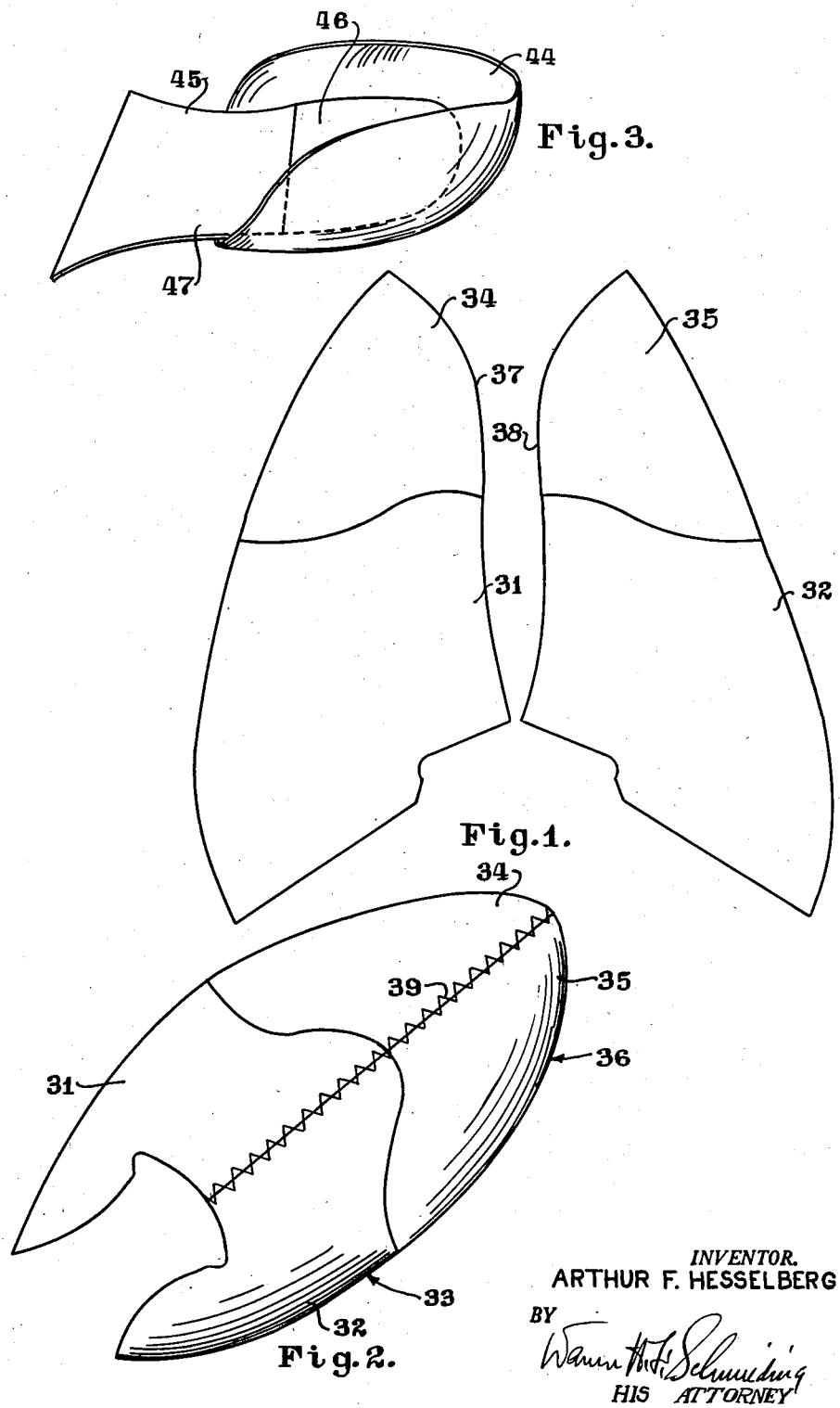

Sept. 25, 1951 A. F. HESSELBERG 2,569,055
PROCESS OF MAKING SHOES
Filed March 4, 1947 7 Sheets-Sheet 2

INVENTOR.
ARTHUR F. HESSELBERG
BY
HIS ATTORNEY

Sept. 25, 1951　　　A. F. HESSELBERG　　　2,569,055
PROCESS OF MAKING SHOES

Filed March 4, 1947　　　　　　　　　　　　7 Sheets-Sheet 3

INVENTOR.
ARTHUR F. HESSELBERG
BY
HIS ATTORNEY

Sept. 25, 1951         A. F. HESSELBERG         2,569,055
                       PROCESS OF MAKING SHOES Filed March 4, 1947                            7 Sheets-Sheet 4

INVENTOR.
ARTHUR F. HESSELBERG

Sept. 25, 1951  A. F. HESSELBERG  2,569,055
PROCESS OF MAKING SHOES
Filed March 4, 1947  7 Sheets-Sheet 5

*INVENTOR.*
ARTHUR F. HESSELBERG
BY
*HIS ATTORNEY*

Sept. 25, 1951  A. F. HESSELBERG  2,569,055
PROCESS OF MAKING SHOES

Filed March 4, 1947  7 Sheets-Sheet 6

INVENTOR.
ARTHUR F. HESSELBERG
BY
HIS ATTORNEY

Sept. 25, 1951  A. F. HESSELBERG  2,569,055
PROCESS OF MAKING SHOES
Filed March 4, 1947  7 Sheets-Sheet 7

INVENTOR.
ARTHUR F. HESSELBERG
BY
HIS ATTORNEY

Patented Sept. 25, 1951

2,569,055

UNITED STATES PATENT OFFICE 2,569,055

PROCESS OF MAKING SHOES

Arthur F. Hesselberg, Columbus, Ohio, assignor to The H. C. Godman Company, Columbus, Ohio, a corporation of Ohio Application March 4, 1947, Serial No. 732,299

1 Claim. (Cl. 12—142)

This invention relates to shoes and to the process of making a shoe.

One object of this invention is to provide a process of manufacturing a shoe wherein the vamp liner and the quarter liner are sewed to the outer edge of the insole and above the insole along the entire periphery thereof.

Another object of this invention is to provide a process of manufacturing a shoe wherein the upper liner is secured to the inner portion of a laminated insole and the upper is secured to a filler sole disposed on the opposite side of the insole.

Another object of this invention is to provide a process of manufacturing a shoe that has a box toe section formed of a pair of similar complementary relatively stiff sections which are secured to a pair of similar complementary sections that make up a vamp lining.

Another object of this invention is to provide a unitary counter and shank tuck.

A further object of this invention is the process of manufacturing a shoe wherein the laminated insole is sewed to the lower edge of the lining, a last is inserted in the lining and insole, a filler sole is secured to the outside of the insole, a counter is secured, and then the upper is pulled down over the lining and then secured to the lower edge of the upper beneath the outer edge of the filler sole.

Further objects and advantages will be apparent from the following description, reference being had to the accompanying drawings wherein a preferred embodiment of the present invention is clearly shown.

In the drawings:

Fig. 1 is a top view of the complementary sections of the vamp liner with the box toe sections secured thereto;

Fig. 2 is a perspective view showing the manner in which the complementary sections, with the box toe sections secured thereto, are stitched together;

Fig. 3 is a perspective view of the counter and shank tuck sub-assembly;

Figure 16:
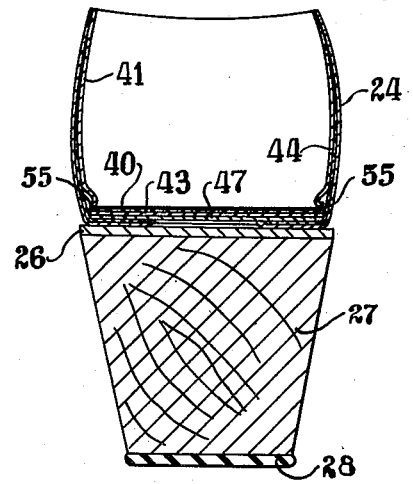
Fig. 16 is a view, on a larger scale, in vertical section on line 16—16 of Fig. 14.
Figure 13:
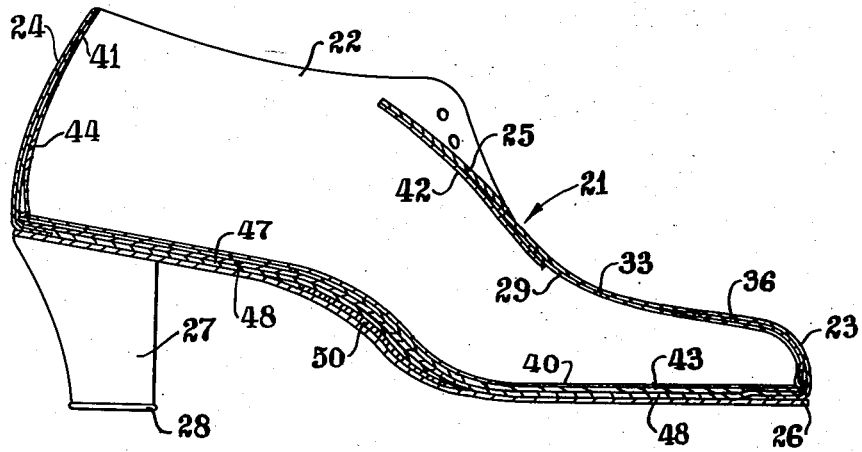
Fig. 13 is a longitudinal sectional view of the complete shoe structure.

Referring to the drawing, and more specifically to Fig. 13, wherein there is disclosed a shoe 21 having an exterior including an upper 22. The upper 22 includes a vamp 23, a quarter 24 and a tongue 25. An outer sole 26 is attached to the upper 22. A heel 27, having a rubber portion 28, is secured to the outer sole 26. The interior of the shoe comprises a liner 29 which includes a vamp liner 33 associated with a box toe section 36, a quarter liner 41 and a tongue liner 42. The liner 29 is stitched to a laminated insole in a manner to be explained later herein. A sock liner or upper insole layer 40 is preformed to the shape of the relatively thicker lower insole layer 43 and is suitably secured thereto whereby they form the laminated insole. Although the lamination of the layers 40 and 43 are flexible yet this lamination is less flexible than the liner 29. To provide rigidity to the rear portion of the shoe, there is inserted between the upper 22 and the quarter liner 41 a molded counter 44. Referring to Figs. 3 and 16, it will be seen that the bottom of the counter is flanged inwardly at the rear and at opposite sides. A shank tuck 47 is secured to the top side of the flanged portions of the counter 44 and the flanged portion and shank tuck are interposed between the insole layer 43 and the outer sole 26. The shank tuck extends throughout the shank of the shoes. Added comfort of wear and durability is obtained by the insertion of a suitable cushion filler sole 48 adjacent to the insole layer 43. Placed under a portion of the shank tuck 47 and the cushion filler 48, as indicated in Fig. 13, is a metal shank 50.

The steps involved in obtaining the shoe disclosed herein are to initially cut two similar complementary sections 31 and 32 out of any suitable shoe lining material. A second pair of similar complementary sections 34 and 35 which conform to the shape of the forepart of the sections 31 and 32 are cut from a preferably stiff fabric material. The sections 34 and 35 are then secured to the sections 31 and 32, as indicated in Fig. 1, in any suitable manner, preferably using cement as a binder. The inner edes 37 and 38 of the complementary sections 31 and 32 are then placed so as to abut one another and are then secured together by sewing as indicated by the longitudinally extending zigzag stitching 39 shown in Fig. 2 to form the vamp liner 33. The inner edges of the sections 31 and 32, as well as the inner edges of the sections 34 and 35 secured thereto, are cut in such a shape that when they are secured together by sewing they form a rigid upwardly bulging or box toe section 36.

Figure 4:
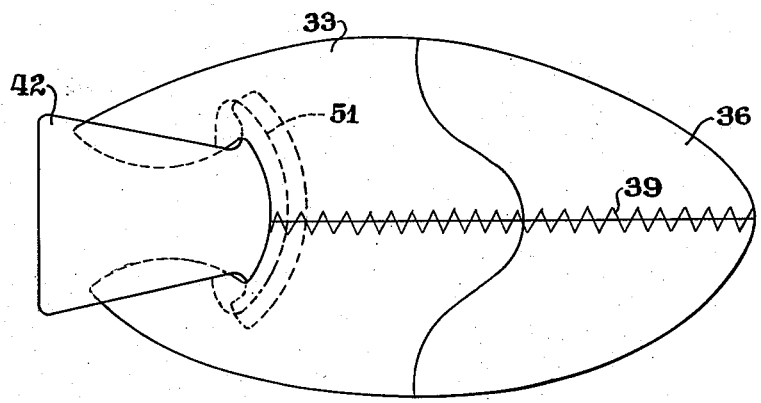
Fig. 4 is a plan view showing the tongue liner sewed to the vamp liner.
Figure 5:
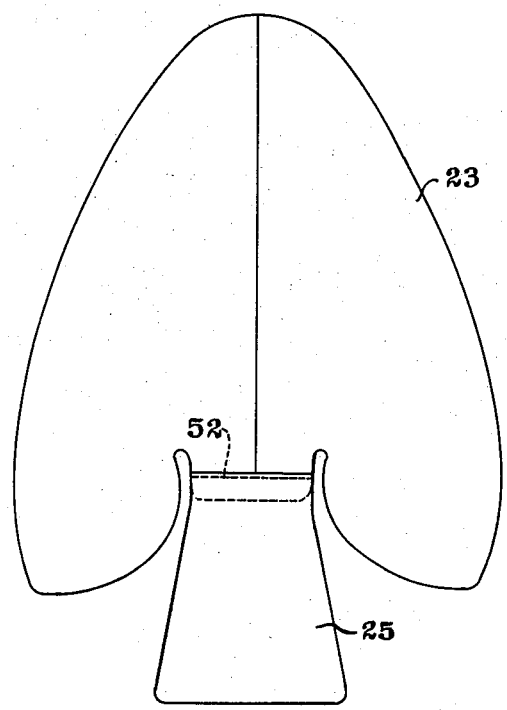
Fig. 5 is a plan view showing the tongue sewed to the vamp portions of the upper.

The tongue liner 42 is then stitched to the vamp liner 33 as indicated by the stitching 51 in Fig. 4. The tongue 25, in a similar manner, is attached to the vamp 23 by the stitching 52, indicated in Fig. 5.

Figure 6:
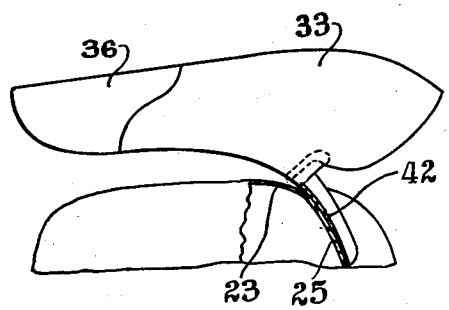
Fig. 6 is a fragmentary view partially in section and partially in elevation showing the tongue and the vamp portion of the upper sewed to the tongue liner.
Figure 7:
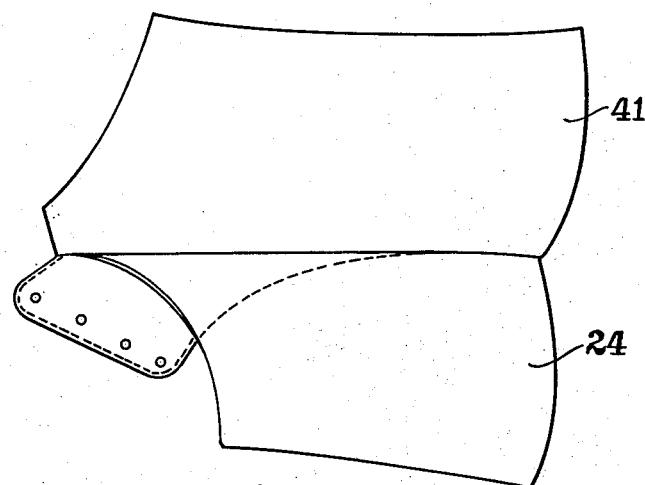
Fig. 7 is a side view in elevation showing the quarter liner sewed to the quarter.
Figure 8:
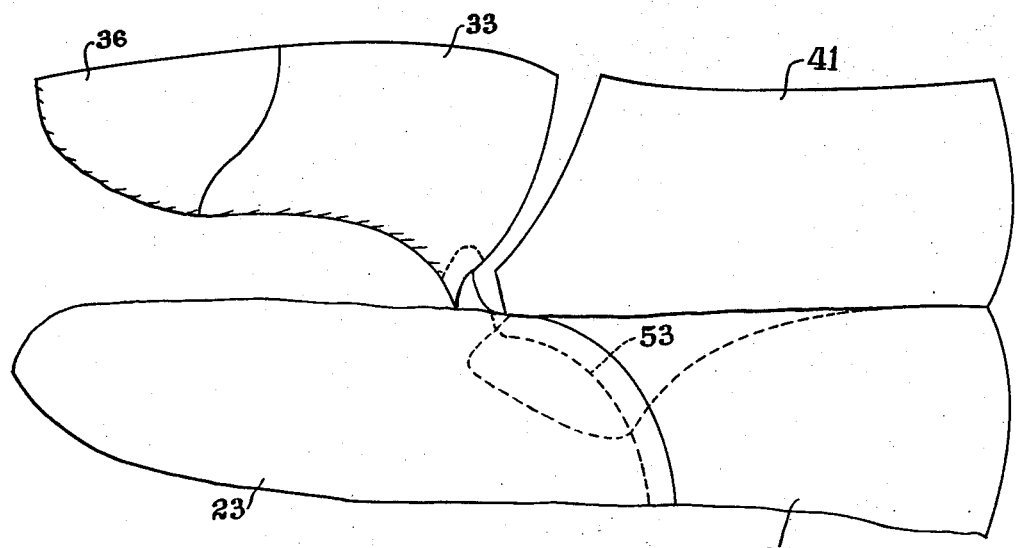
Fig. 8 is a side view in elevation showing the quarter and the quarter liner sewed to the tongue.
Figure 9:
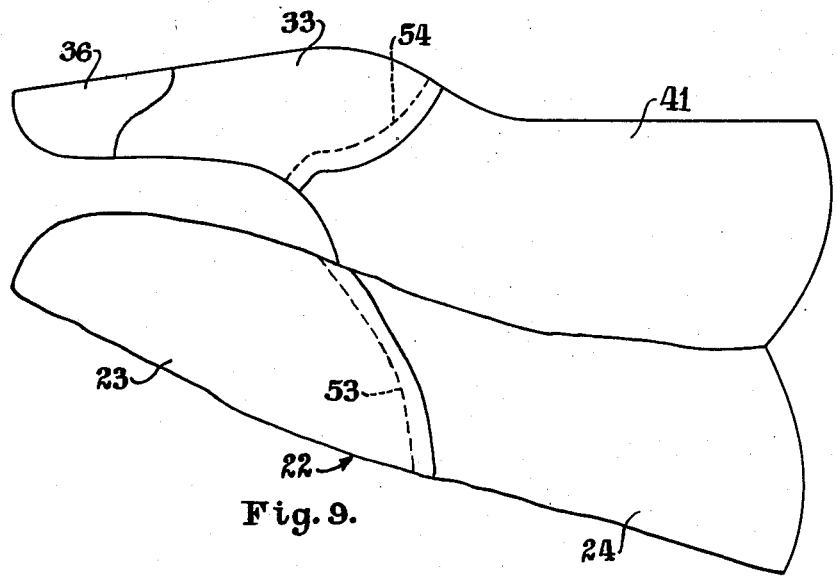
Fig. 9 is a side view in elevation similar to Fig. 8 showing the quarter liner side seamed to the vamp liner.

Sewed to the tongue liner 42, as indicated in Fig. 6, are the tongue 25 and the attached vamp 23. The quarter sections which make up the quarter 24 of the upper 22 are then stitched along their upper edge to the quarter liner 41 as shown in Fig. 7. The vamp 23 is then secured to the quarter 24 by sewing as shown by the stitching 53 of Fig. 8. The quarter liner 41 is side seamed to the vamp liner 33 as discolsed at 54 of Fig. 9.

Figure 10:
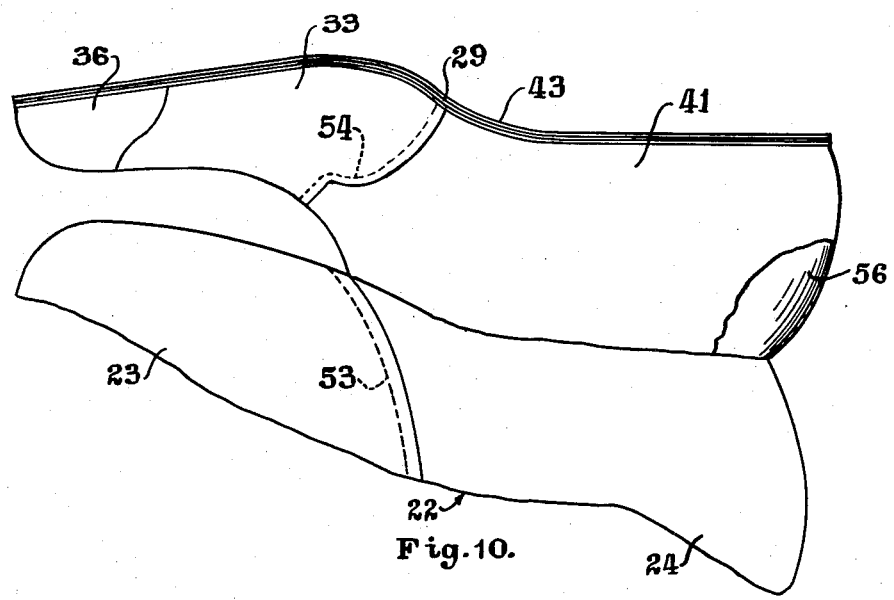
Fig. 10 is a side view in elevation partially in section similar to Fig. 9 showing the vamp liner and quarter liner stitched to the insole and a last inserted therein.
Figure 15:
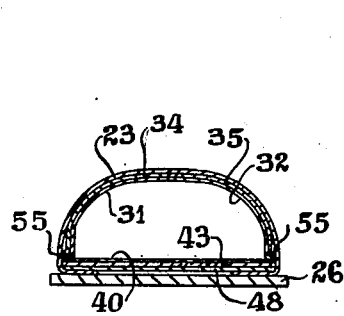
Fig. 15 is a view, on a larger scale, in vertical section on line 15—15 of Fig. 14.
Figure 11:
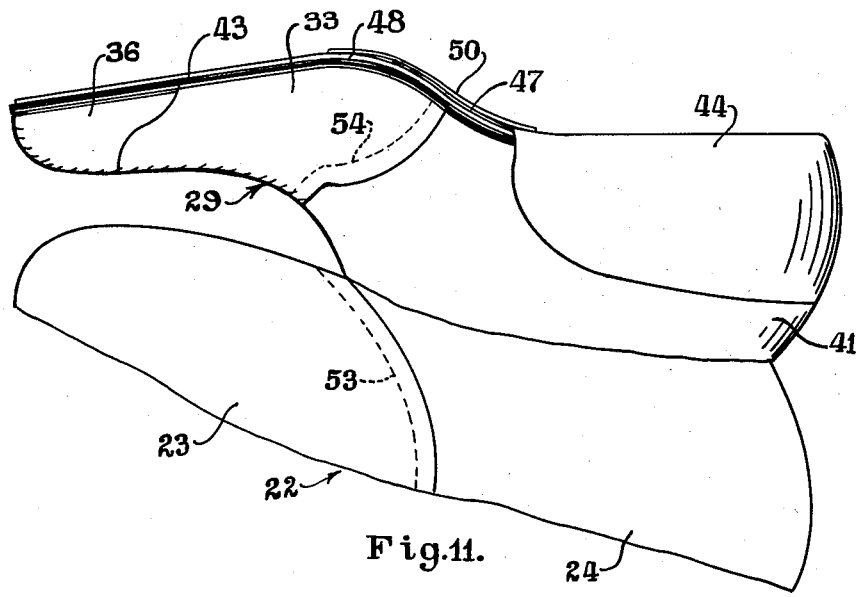
Fig. 11 is a side view in elevation similar to Fig. 10 with the counter and shank tuck sub-assembly and the cushion filler in position.

The edge along the entire periphery of the laminated liner 29 is then turned outwardly and placed on the top portion of the insole and is sewed to the laminated insole, including sock liner 40 and layer 43, along its entire periphery, as is shown at 55 in Figs. 15 and 16. A last 56 is inserted into the liner 29 and the laminated insole and spread, as shown in Fig. 10, with the upper 22 turned down. The entire outer surface of the insole layer 43 is covered with a suitable cement which is allowed to partially dry after which time a suitable cushion filler sole 48 is applied to the insole as indicated in Fig. 11.

In Fig. 3 is shown a counter and shank tuck sub-assembly. The sub-assembly includes a counter 44, molded from leather, fiber, heavy paper or a plastic, and a two piece shank tuck 47. The shank tuck 47 is formed of members 45 and 46 which together are attached to the flange of the counter 44 in any suitable manner, preferably by stapling. The sub-assembly is then placed in position with the shank tuck 47 overlying (when the shoe is upside down) the heel and shank portions of the insole 43, the flanges of the counter overlying the heel portion of the tuck and the sides of the counter surrounding the rear and opposite sides of the quarter liner 41, as shown in Fig. 11. The fore part of the tuck 47 overlies the rear portion of the cushion filler 48.

Figure 12:
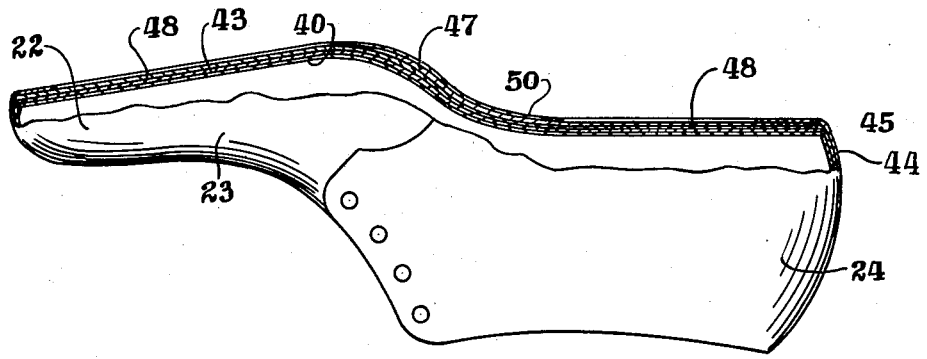
Fig. 12 is a view partially in section and partially in elevation showing the upper lasted and the metal shank or brace member in position.
Figure 14:
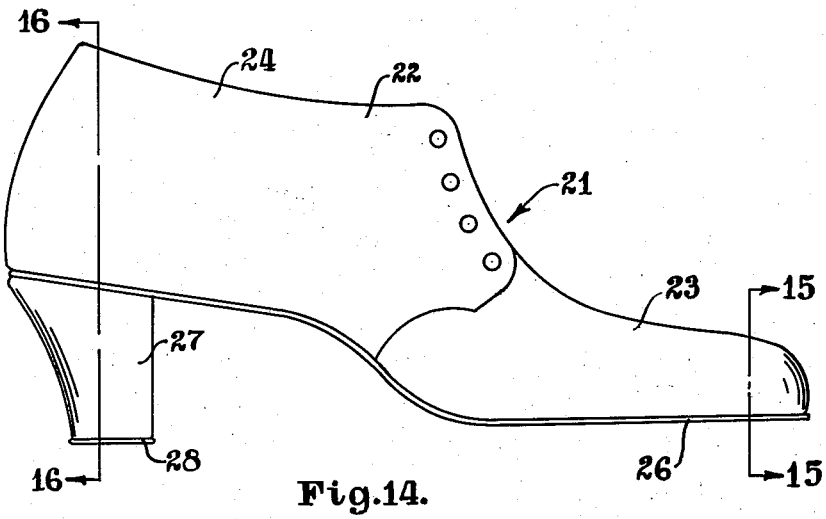
Fig. 14 is a side view in elevation of the complete shoe structure.

After the cushion filler sole 48 and the counter and shank tuck sub-assembly are attached, the upper 22 which had been suspended from the quarter liner 41 is turned inwardly and upwardly and, after cement or any other suitable adhesive material has been applied to the inner edge of the upper 22, the cushion filler sole 48 and the counter and shank tuck, the upper 22 is lasted along its entire periphery as shown in Fig. 12. The outer portion of the edge of the upper 22 is roughened and a suitable adhesive is applied thereto as well as to the remainder of the underside of the shoe. By the application of pressure an outer sole 26 is secured to the underside of the shoe. The remainder of the steps involved in the manufacture of the shoe herein disclosed are carried out in the conventional manner. A rough heel 27 is cemented, nailed or screwed to the outer sole 26 and is thereafter trimmed and the entire shoe scoured and polished resulting in the finished shoe 21, shown in Fig. 14.

A shoe, manufactured in accordance with the process disclosed in this application, wherein a liner of a relatively flexible material is sewed to a laminated insole including a sock lining and an insole layer of relatively less flexible material, possesses a degree of flexibility heretofore not obtained in a shoe.

The shoe disclosed herein contains further novelty in that it provides a box toe section that is secured to the vamp lining. The pair of similar complementary sections that form the box toe section and the pair of similar complementary sections that form the vamp liner are so cut that when they are secured together by stitching they form an upwardly bulging or box toe. The toe stiffeners used in the past have been formed by use of molding forms which are not necessary in the novel box toe herein disclosed.

While the form of embodiment of the present invention as herein disclosed constitutes a preferred form, it is to be understood that other forms might be adopted, all coming within the scope of the claim which follows.

I claim:

Those steps in the manufacture of a shoe having a quarter and vamp lining, a box toe, a laminated insole, and an upper, which steps comprise securing the box toe to the fore part of the lining, securing the upper to the upper edge of the entire lining, then securing the entire peripheral edge of the laminated insole to the entire peripheral lower edge of the quarter and vamp lining and box toe subassembly, inserting a last in the lining and insole subassembly, pulling the upper over the lining and box toe, and securing the lower edge of the upper beneath the lower outer edge of the insole.

ARTHUR F. HESSELBERG.

REFERENCES CITED

The following references are of record in the file of this patent:

UNITED STATES PATENTS

| Number | Name | Date |
|---|---|---|
| 1,274,665 | Baynard | Aug. 6, 1918 |
| 2,180,996 | Prewitt | Nov. 21, 1939 |
| 2,379,681 | Cohen | July 3, 1945 |
| 2,384,431 | Beestrum | Sept. 11, 1945 |
| 2,391,437 | Moskowitz et al. | Dec. 25, 1945 |
| 2,393,989 | Kamborian | Feb. 5, 1946 |
| 2,404,586 | Maling | July 23, 1946 |
| 2,404,587 | Maling | July 23, 1946 |
| 2,406,091 | Mathieson | Aug. 20, 1946 |
| 2,412,773 | Herlihy | Dec. 17, 1946 |
| 2,414,104 | Kamborian | Jan. 14, 1947 |
| 2,414,105 | Kamborian et al. | Jan. 14, 1947 |
| 2,422,684 | Kamborian et al. | June 24, 1947 |
| 2,425,420 | Chandler | Aug. 12, 1947 |
| 2,439,900 | Murphy | Apr. 20, 1948 |
| 2,443,588 | Ayers | June 22, 1948 |
| 2,445,847 | Curtis | July 27, 1948 |
| 2,446,286 | Kamborian | Aug. 3, 1948 |
| 2,464,355 | Starner | Mar. 15, 1949 |